Dec. 6, 1960  F. R. WOLF ET AL  2,963,678
TERMINAL LUG FOR SOLENOID
Filed Jan. 10, 1955
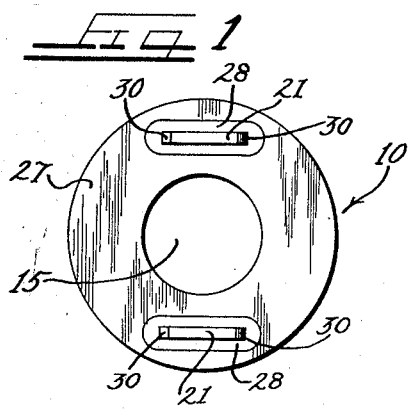
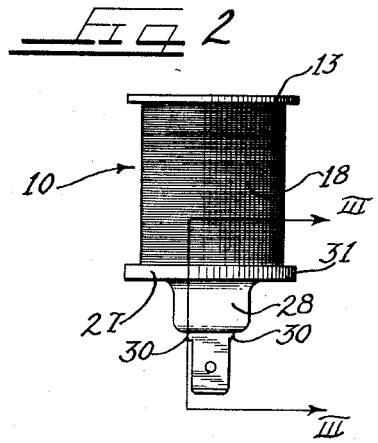
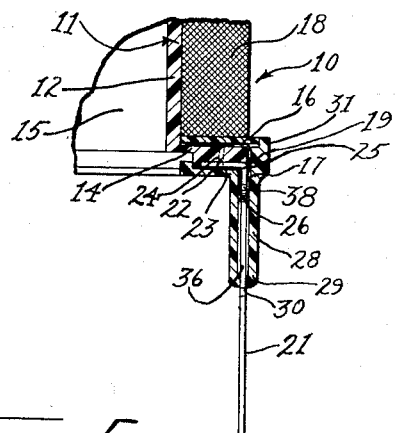
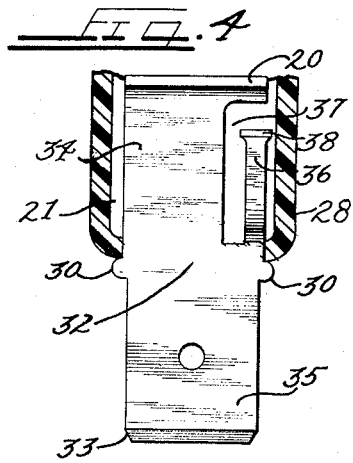
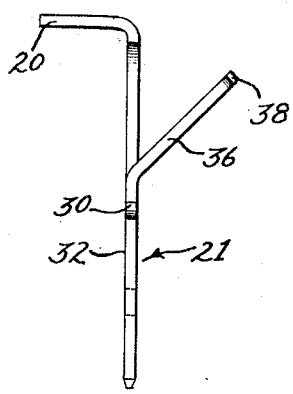
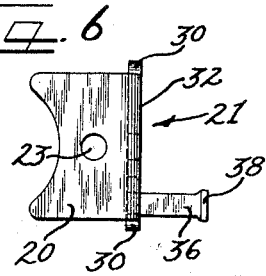
Inventors
FORREST R. WOLF
RICHARD S. STONE
ELROY H. ANDERSON United States Patent Office 2,963,678
Patented Dec. 6, 1960

2,963,678

TERMINAL LUG FOR SOLENOID

Forrest R. Wolf, Arlington Heights, Richard S. Stone, Chicago, and Elroy H. Anderson, Arlington Heights, Ill., assignors to the Dole Valve Company, Chicago, Ill., a corporation of Illinois Filed Jan. 10, 1955, Ser. No. 480,688

2 Claims. (Cl. 339—147)

The present invention relates to an electrical connection, and more particularly relates to a terminal lug and a method of preparing an electrically responsive device for connection with a source of electrical power.

Although the method and terminal lug described in the present invention are such as to enjoy general utility in their field they are of particular importance for use in conjunction with the manufacture of solenoid windings and structures such as in the manufacture of solenoid operated valves and the like.

In the manufacture of solenoid actuated and controlled valves, the wire which is wound on the spool or bobbin for the solenoid is often very fine wire and frequently such as to have a diameter of about .0045", and accordingly is quite fragile and susceptible of breakage due to mechanical fatigue, etc.

In winding such coils with such fine wire it has heretofore been the practice to bring the lead wires from the coil out at a single end of the coil and attach them directly to a terminal lug. When attaching these lead wires to the terminal lugs the wires were wound on the terminal lugs after the insulation had been stripped from the lead wires and the operation of winding the lead wires on to the terminal lugs left substantially no slack in the lead wires; that is, the lead wires were tautly wound on the terminal lugs. Further, operation of the solenoid often causes mechanical fatigue of the lead wire through inadvertent or necessary flexing of the terminal lugs with a resulting loss of the entire solenoid structure.

Another source of loss of the entire solenoid structure occurred due to overheating and melting of the bobbin, or spool, when soldering the lead wires onto the terminal lugs. This was a direct result of the fact that the terminal lugs were rather heavy and required high soldering temperatures in order to solder the lead wires to them. Since the lead wires were quite fine, as described, they were quite susceptible to fracture due to fatigue.

By forming the terminal lugs in accordance with the principles of the present invention and by preparing the solenoids for connection to a source of electrical energy in accordance with the principles of the present invention, the above discussed difficulties are avoided since the present invention makes possible a substantial reduction in the necessary soldering temperature and further provides slack in the fine lead wires leading from the solenoid winding or coil.

Terminal lugs embodying the principles of the present invention are provided with an integral terminal tab which is of considerably smaller dimension than the main shank portion or body portion of the terminal lug, whereby connection of the lead wires from the solenoid winding may be attached thereto and soldered at a substantially lower temperature than those temperatures which were heretofore required for such soldering.

Further, these terminal lugs have a tab thereon so formed that when originally wrapping the lead wire thereon, the terminal tab on the lug is bent outwardly from the main body portion of the lug or the shank of the lug so that after the wrapping and soldering is completed, the tab may be bent back to aligned position with respect to the shank thereby producing slack in the lead wires so that they are no longer stressed or under tension. By these means, subsequent handling of the coil will not cause the mechanical fatigue of the wire and therefore will not break the same.

It is, therefore, an important object and feature of the present invention to provide a new and improved terminal lug with integral terminal tabs thereon for securing lead wires thereto.

Another object of the present invention is to provide a new and improved terminal lug with integral displaceable terminal tabs thereon whereby aligning the terminal tabs at the shank of the terminal lug will produce a slack in lead wires secured to the terminal tab.

Another object of the present invention is to provide a new and improved method of preparing an electrically responsive device for connection to a source of electrical energy by winding a coil of relatively fine wire on a bobbin and connecting the lead wires from the coil to a terminal tab on a terminal lug secured to the bobbin and then aligning the terminal tab with the shank of the terminal lug to produce a slack in the lead wire.

Still another object of the present invention is to provide a new and improved solenoid construction wherein terminal lugs affixed to a bobbin carrying the solenoid winding or coil are provided with lateral projections thereon which cooperate with an insulating member having pants which engage the projections.

Still another object of the present invention is to provide a new and improved solenoid construction wherein the terminal lugs are provided with a connecting tab and ear-like projections for connecting lead wires to the tabs and insulatingly covering the same with an insulator that cooperates with the ear-like portions which cooperate therewith to retain the insulator in place.

Still another object of the present invention is to provide a new and improved terminal lug with relatively small ear-like lateral projections thereon which will cooperate with an insulator to retain the insulator in place on the terminal lug.

Still other objects, features and advantages of the present invention will become readily apparent from the following detailed description of the present invention and an embodiment thereof, from the claims, and from the accompanying drawings in which each and every detail shown is fully and completely disclosed as a part of this specification, in which like reference numerals refer to like parts, and in which:

Figure 1 is a bottom plan view of a solenoid prepared in accordance with the method of the present invention and having terminal lugs thereon embodying the principles of the present invention;

Figure 2 is a side elevational view of the solenoid of Figure 1;

Figure 3 is an enlarged fragmental sectional view of a terminal portion of the solenoid of Figures 1 and 2 and viewed substantially as taken along the line III—III of Figure 2;

Figure 4 is a front elevational view of a terminal lug embodying the principles of the present invention;

Figure 5 is a side elevational view of the terminal lug shown in Figure 4; and

Figure 6 is a top plan view of the terminal lug shown in Figures 4 and 5.

As shown on the drawings:

There is illustrated in the drawings a solenoid 10 which is representative of any electrical device to which the principles of the present invention may be applied. This particular solenoid may further be used in any device wherein a solenoid may be found, such as in combination with a plug-in type solenoid actuated valve or the like such as those which are now known in the art.

The solenoid construction illustrated here, however, is provided with a completely integral bobbin such as a molded bobbin or spool formed from such an insulating material as nylon or the like and illustrated generally at 11. This bobbin or spool 11 has a barrel portion 12 and integral end flanges 13 and 14 and is provided with an axial opening 15 for the axial reciprocation of a solenoid armature or core member (not shown).

To complete the solenoid, a split insulating washer 16 is disposed thereon adjacent to the inner face of the end flange 14 and lead wires are brought over the edges of the flange in a radial recess 17 therein and thence through the split in the washer, after which the wire is wound on the barrel between the end flanges to form a coil or winding 18.

Axial recesses 19 in the outer face of the end flange 14 are provided for acceptance of the foot 20 of a terminal lug 21 which may then be secured to the end flange 14 as by a rivet 22 or the like passing through appropriate apertures 23 and 24 in the foot 20 and flange 14.

It will be understood, of course, that in practice the terminal lugs 21 will be secured to the end flange 14 before the coil is wound on the barrel 12 of the spool 11, so that immediately upon winding the coil 18 the lead wires 25 may be respectively secured thereto. The lead wires 25 are secured to the terminal lugs by such means as wrapping the same therearound, as at 26, and then soldering the same for positive mechanical and electrical connection between the terminal lugs 21 and the respective lead wires 25.

Thereafter, an insulating skirt member 27 is slipped over the terminal lugs 21 and urged against the outer face of the end flange 14 and the bottom face of the foot 20. Pants-like portions 28 surround the upper portions of the terminal lugs 21, and particularly in the region 26 thereof where the lead wire 25 is secured thereto. These pants members are provided with increased thickness at lower ends 29 so that the insulator 27 will snap in place over ears 30 which may be formed upon formation of the lug or which may be swedged, etc. to extend laterally from the terminal lugs 21 and cooperate therewith to retain the insulating member in place. Further, a peripheral flange 31 on the insulator 27 engages the outer periphery of the end flange 14 on the bobbin 11 and also engages the outer periphery of the washer 16, thereby preventing any possible short circuiting or arcing over between the lead wires 25 and the various levels of the winding in the coil 18.

As described hereinabove, it was heretofore a common practice to wind the lead wire 25 about the entire shank portion of the terminal lug 21. As stated, such practice places the lead wire 25 under continuous stress and further requires high soldering temperatures for soldering the lead wire to the shank of the terminal lug.

Terminal lugs embodying the principles of the present invention, however, avoid this detrimental practice and thereby give longer life and greater handling convenience to the solenoid 10. A terminal lug embodying this invention is illustrated in great detail in Figures 4, 5 and 6 wherein the terminal lug 21 is shown as having a main body or shank portion 32 and an integral foot 20 which is bent at right angles to the shank 32 at one end thereof.

The terminal lugs 21 are preferably formed from a relatively strong and good electrically conductive material such as copper or brass or aluminum or the like and particularly formed from an elongated strip thereof. The ears 30 extend laterally from the side edges of the shank 32 about midway between the foot 20 and the free or plug-in end 33 of the terminal lug 21. Also, for purposes of convenience, the shank may be somewhat wider in the region 34 thereof between the foot 20 and the ears 30 than it is between the ears 30 and the free end or plug-in end 33. Further, the ears 30 may be formed either as an original form in the punching of the terminal lug or may be swaged out in a further stage of processing the terminal lug. Immediately between one of the ears 30 and the foot 20, along one edge of the region 34 of the terminal lug 21 there is formed therein a terminal tab 36 which is provided by punching or otherwise cutting an elongated L-shaped slot 37 in the terminal lug.

The slot 37 extends for substantially the full length of the section 34 of the shank 32 between the ears 30 and the foot 20, with the longitudinally extending portion thereof being spaced substantially less than halfway from one lateral edge of the shank 32 so that the terminal tab 36 has a relatively narrow transverse dimension and a relatively long longitudinal dimension.

The terminal tab 36 on the terminal lug 21 thus provides a relatively small mass means for connection with the lead wire 25 so that the lead wire may be relatively easily wrapped thereon and soldered thereto at a substantially lower soldering temperature than that which was required for soldering the lead 25 to the whole mass of the shank 32 of the terminal lug 21. By providing a smaller mass for connection with the lead wire, the lower required soldering temperature thus substantially prevents fatigue in the lead wire 25 and further substantially prevents melting of the spool 11 and more particularly melting of the end flange 14 of the spool 11 when the spool is formed from such a meltable material as insulating nylon and the like.

An additional feature of the provision of the terminal tab 36 is that it may be bent outwardly or displaced from the remainder of the shank 32 of the terminal lug before connection of the lead wire 25 thereto as illustrated in Figures 5 and 6. By so bending the terminal tab 36 outwardly, the lead wire 25 may be secured thereto with greater convenience to the assembler. Thereafter, the terminal tab 36, in accordance with the method of the present invention, is bent back to an aligned position with the shank 32 of the terminal lug 21 and thus provides a slack in the lead wire 25, since the distance between the wrappings 26 on the terminal tab 36 and the peripheral edge of the flange 14 on the spool 11 is decreased by this realignment of the integral parts of the terminal lug 21.

To prevent any possibility of accidental removal of the lead wire 25 from the terminal tab 36, after the same has been wrapped thereon, the terminal tab 36 may have its free end 38 laterally enlarged. This lateral enlargement may be provided either as an original formation in the punching of the terminal lug or may be formed later by any such convenient means as swaging or the like.

Thus, it will readily be observed that in accordance with the methods of the present invention for preparing a solenoid for connection with a source of electrical energy, the lead wires which are brought out from one end of the coil 18 after the same is wound on the barrel 12 of the spool 11, are connected to the terminal tab 36 while the terminal tab is disaligned or bent outwardly from aligned position with the remainder of the terminal lug 21. After the lead wires have been wound on and soldered to the terminal tab 36, the terminal tab is then realigned with the remainder of the terminal lug so as to provide slack in the lead wire and thereby reduce any possibility of mechanical fatigue thereof due to tension etc.

The free end 35 of the terminal lug 21 is readily adapted to form the male member for a plug in an electrical connection, and its end 33 may be reduced as by swaging or the like for more ready insertion thereof into a female connector which is in turn connected to a source of electrical energy or to a control system for the solenoid etc.

From the foregoing it will be observed that numerous variations and modifications may be made in the methods and articles of the present invention without departing from the true spirit and scope of the novel concepts and principles thereof. Accordingly, we intend to cover all such modifications and variations set forth in the true spirit and scope of the novel concepts and principles of our invention.

We claim as our invention:

1. In a solenoid construction wherein a coil is wound on a spool having opposite flanges, a generally L-shaped terminal lug having a foot, means attaching said foot to one of said flanges, said terminal lug having a terminal lug portion extending at right angles to said foot, said lug portion having a recessed portion extending therealong for a portion of the length thereof and terminating adjacent said foot and having a terminal tab extending inwardly along said recessed portion toward said foot, said terminal tab being outwardly displaceable with respect to said lug portion to accommodate a lead wire to be attached thereto and being movable inwardly with respect to said lug portion into alignment therewith to provide slack in the lead wire, and a flexible insulating member fitting over said lug portion and terminal tab and maintaining said terminal tab in position in alignment with said lug portion to retain slack in the lead wire.

2. In a solenoid construction wherein a coil is wound in a spool having opposite flanges, a generally L-shaped terminal lug having a foot, means attaching said foot to one of said flanges, said terminal lug having a terminal lug portion extending at right angles to said foot, said terminal lug portion having a recessed portion therein terminating closely adjacent said foot and having a terminal tab extending inwardly along said recessed portion toward said foot, said terminal tab being outwardly displaceable with respect to said lug portion to accommodate a lead wire to be attached thereto and being movable inwardly with respect to said lug portion into alignment therewith to provide slack in the lead wire, a flexible insulating member having a portion closely conforming to said lug portion, a pair of laterally extending ear-like projections on said lug portion spaced outwardly of said recessed portion to retain said insulating member in place over said lug portion and terminal tab, said insulating member being adapted to snap over said ear-like projections and to maintain said terminal tab in alignment with said lug portion to retain slack in the lead wire.

References Cited in the file of this patent

UNITED STATES PATENTS

| | | |
|---|---|---|
| 1,813,154 | Franz | July 7, 1931 |
| 1,932,923 | Bullinger | Oct. 31, 1933 |
| 2,214,151 | Wagar | Sept. 10, 1940 |
| 2,223,469 | Tulchin | Dec. 3, 1940 |
| 2,517,677 | Kjell-Berger | Aug. 8, 1950 |
| 2,636,963 | Wakefield | Apr. 28, 1953 |
| 2,667,624 | Bels | Jan. 26, 1954 |
| 2,732,529 | Reid | Jan. 24, 1956 |